(12) United States Patent
Lee

(10) Patent No.: US 11,491,404 B2
(45) Date of Patent: Nov. 8, 2022

(54) METHOD AND SYSTEM FOR REPLACING PLAYER IN SPORTS GAME

(71) Applicant: GAMEVIL INC., Seoul (KR)

(72) Inventor: Dong Won Lee, Seoul (KR)

(73) Assignee: GAMEVIL INC., Seoul (KR)

( * ) Notice: Subject to any disclaimer, the term of this patent is extended or adjusted under 35 U.S.C. 154(b) by 297 days.

(21) Appl. No.: 16/877,201

(22) Filed: May 18, 2020

(65) Prior Publication Data
US 2020/0376388 A1    Dec. 3, 2020

(30) Foreign Application Priority Data
Jun. 3, 2019 (KR) .......................... 10-2019-0065190

(51) Int. Cl.
*G06F 3/048* (2013.01)
*A63F 13/795* (2014.01)
(Continued)

(52) U.S. Cl.
CPC .......... *A63F 13/795* (2014.09); *A63F 13/812* (2014.09); *G06F 3/04845* (2013.01); *A63F 2300/308* (2013.01)

(58) Field of Classification Search
CPC ... A63F 13/795; A63F 13/812; G06F 3/04845
See application file for complete search history.

(56) References Cited

U.S. PATENT DOCUMENTS

| | | | |
|---|---|---|---|
| 2011/0202872 A1* | 8/2011 | Park | G06F 3/0486 715/788 |
| 2012/0149472 A1* | 6/2012 | Miller | A63F 13/65 463/42 |

(Continued)

FOREIGN PATENT DOCUMENTS

| | | |
|---|---|---|
| JP | 2009028217 A | 2/2009 |
| JP | 2014233527 A | 12/2014 |

(Continued)

OTHER PUBLICATIONS

"Isamanru 2015 KBO", Internet post (Sep. 27, 2017), https://awiki.theseed.io/w/%EC%9D%B4%EC%82%AC%EB%A7%8C%EB%A3%A82015%20KBO, 31 pages.

(Continued)

*Primary Examiner* — David E Choi
(74) *Attorney, Agent, or Firm* — Christensen O'Connor Johnson Kindness PLLC

(57) ABSTRACT

Disclosed are a method and system for replacing a player in a sports game. A player replacement method may include providing a management interface for managing, for each position, characters assigned to a user among characters in a sports game, recognizing a first input of the user for a first character among the characters displayed through the management interface, determining at least one recommendation character to be replaced with the first character selected by the user among the characters displayed through the management interface in response to the recognition of the first input of the user, and displaying the determined recommendation character differently from the remaining characters displayed through the management interface until a second input of the user related to the replacement of the first character is recognized.

20 Claims, 10 Drawing Sheets

(51) Int. Cl.
*G06F 3/04845* (2022.01)
*A63F 13/812* (2014.01)

(56) References Cited

U.S. PATENT DOCUMENTS

| | | | |
|---|---|---|---|
| 2013/0187866 A1* | 7/2013 | Kim | G06F 3/0488 |
| | | | 345/173 |
| 2013/0282640 A1* | 10/2013 | LaPadula, III | G06Q 10/0637 |
| | | | 706/46 |
| 2018/0348967 A1* | 12/2018 | Kondrk | G06F 8/34 |
| 2020/0289943 A1* | 9/2020 | Rico | A63F 13/35 |
| 2020/0376379 A1* | 12/2020 | Lee | G06F 3/04815 |
| 2020/0376384 A1* | 12/2020 | Lee | A63F 13/63 |
| 2020/0376388 A1* | 12/2020 | Lee | A63F 13/533 |
| 2020/0376390 A1* | 12/2020 | Lee | A63F 13/58 |
| 2020/0376392 A1* | 12/2020 | Lee | A63F 13/828 |

FOREIGN PATENT DOCUMENTS

| | | |
|---|---|---|
| KR | 10-2012-0051421 A | 5/2012 |
| KR | 10-2013-0054351 A | 5/2013 |
| KR | 10-2016-0149980 A | 12/2016 |

OTHER PUBLICATIONS

"This is an event information for the full count pre-registration (professional baseball) of Isamanru.", Internet blog post (Sep. 27, 2017), https://blog.naver.com/royalstorm/220264628701.
Office Action dated Oct. 20, 2020, in corresponding Korean application No. 10-2019-0065190 (Korean version), filed Jun. 3, 2019, 7 pages.
Office Action dated Jun. 6, 2021, in corresponding Japanese application No. 2020-082247 (Japanese version), 2 pages.

* cited by examiner

METHOD AND SYSTEM FOR REPLACING PLAYER IN SPORTS GAME

CROSS REFERENCE TO RELATED APPLICATION

This application is based on and claims priority under 35 U.S.C. 119 to Korean Patent Application No. 10-2019-0065190, filed on Jun. 3, 2019, in the Korean Intellectual Property Office, the disclosures of which is herein incorporated by reference in their entireties.

BACKGROUND OF THE INVENTION

Field of the Invention

The following description relates to a method and system for replacing a player in a sports game.

Related Art

A sports game is a game based on sports, such as baseball, soccer, or basketball, and is divided into an action game genre and a simulation game genre. However, the sports game itself tends to be classified as a separate genre. In such a sports game, there are multiple characters that perform a corresponding sports event. From a viewpoint of a given user, it is necessary to select characters that belong to characters assigned to the user and that will be on from the start in a specific sports game instance to be performed by the user. For example, in a baseball game, it is necessary to organize a team configured with 9 players, in other words, 9 characters. Accordingly, a user may select the 9 characters that will be on from the start among characters assigned to the user. Furthermore, in a sports game, it is necessary to deploy multiple characters, corresponding to multiple players, at start and candidate locations corresponding to positions desired by a user because multiple candidate players are present for each position. For example, Korean Patent Application Laid-Open No. 10-2016-0149980 displays that a user can replace the original character, displayed in a starting order area, with the original character displayed in a candidate player area by dragging & dropping, to the candidate player area, the original character displayed in the starting order area.

SUMMARY OF THE INVENTION

Provided are a player replacement method capable of recommending at least one different character capable of being replaced with a given character selected by a user at timing at which the user selects the given character if the given character located at a given position in a sports game (e.g., starting position or candidate position in a baseball game) is to be replaced with one of multiple different characters, a computer apparatus performing the player replacement method, and a computer program stored in a computer-readable recording medium in order to execute the player replacement method in a computer apparatus in association with the computer apparatus and a recording medium therefor.

In an embodiment, a player replacement method performed by a computer apparatus including at least one processor includes providing, by the at least one processor, a management interface for managing, for each position, characters assigned to a user among characters in a sports game, recognizing, by the at least one processor, a first input of the user for a first character among the characters displayed through the management interface, determining, by the at least one processor, at least one recommendation character to be replaced with the first character selected by the user among the characters displayed through the management interface in response to the recognition of the first input of the user, and displaying, by the at least one processor, the determined recommendation character differently from the remaining characters displayed through the management interface until a second input of the user related to the replacement of the first character is recognized.

According to one aspect, determining the at least one recommendation character may include determining, as a recommendation character, at least one of characters for a candidate position in the sports game when a position of the first character is a starting position for the sports game, and determining, as a recommendation character, at least one of characters for the starting position when the position of the first character is the candidate position.

According to another aspect, the first input may be an input to drag an object corresponding to the first character in the state in which the selection of the first character has been maintained. Determining the at least one recommendation character may include determining the recommendation character based on at least a region in which the drag is performed.

According to yet another aspect, the management interface may include a first list of characters for a starting position for the sports game and a second list of characters for a candidate position for the sports game. Determining the at least one recommendation character may include selecting the recommendation character among the characters of the first list when the first character is selected in the first list and dragged within the region of the first list, selecting the recommendation character among the characters of the second list when the first character is selected in the first list and dragged toward the second list out of the region of the first list, selecting the recommendation character among the characters of the second list when the first character is selected within the second list and dragged within the region of the second list, and selecting the recommendation character in the first list when the first character is selected in the second list and dragged toward the first list out of the region of the second list.

According to yet another aspect, determining the at least one recommendation character may include determining the recommendation character among characters for a candidate position for the sports game based on at least a total status change of characters for a starting position when each of the characters for the candidate position may be replaced with the first character if a position of the first character is the starting position for the sports game.

According to yet another aspect, determining the at least one recommendation character may include determining the recommendation character among characters for a starting position for the sports game based on at least a total status change of the characters for the starting position when each of the characters for the starting position is replaced with the first character if a position of the first character is a candidate position for the sports game.

According to yet another aspect, the second input may include a cancellation input for cancelling the first input or a selection input for selecting a second character to replace the first character. Displaying the determined recommendation character may include displaying the determined recommendation character differently from the remaining characters displayed through the management interface until the cancellation input or the selection input is recognized.

According to yet another aspect, the first input may include an input to drag an object corresponding to the first character in the state in which the selection of the first character has been maintained. The second input may include an input to release the selection of the first character. Any one of the cancellation of the first input and the selection of a second character to replace the first character may be determined based on a location where the selection is released. Displaying the determined recommendation character may include displaying the determined recommendation character differently from the remaining characters displayed through the management interface until any one of the cancellation of the first input or the selection of the second character is recognized.

In an embodiment, there is provided a non-transitory processor-readable medium having instructions stored thereon, which when executed by one or more processors, cause the one or more processors to implement the method.

In an embodiment, there is provided a computer apparatus including at least one processor implemented to execute instructions readable by a computer. The at least one processor provides a management interface for managing, for each position, characters assigned to a user among characters in a sports game, recognizes a first input of the user for a first character among the characters displayed through the management interface, determines at least one recommendation character to be replaced with the first character selected by the user among the characters displayed through the management interface in response to the recognition of the first input of the user, and displays the determined recommendation character differently from remaining characters displayed through the management interface until a second input of the user related to the replacement of the first character is recognized.

DESCRIPTION OF EXEMPLARY EMBODIMENTS

Hereinafter, embodiments are described in detail with reference to the accompanying drawings.

A player replacement method according to various embodiments of the present invention may be implemented by at least one computer apparatus. A computer program according to an embodiment of the disclosure may be installed and driven in the computer apparatus. The computer apparatus may perform the player replacement method according to an embodiment of the disclosure under the control of a driven computer program. The computer program may be stored in a computer-readable recording medium coupled to the computer apparatus in order to execute the player replacement method in the computer apparatus.

Figure 1:
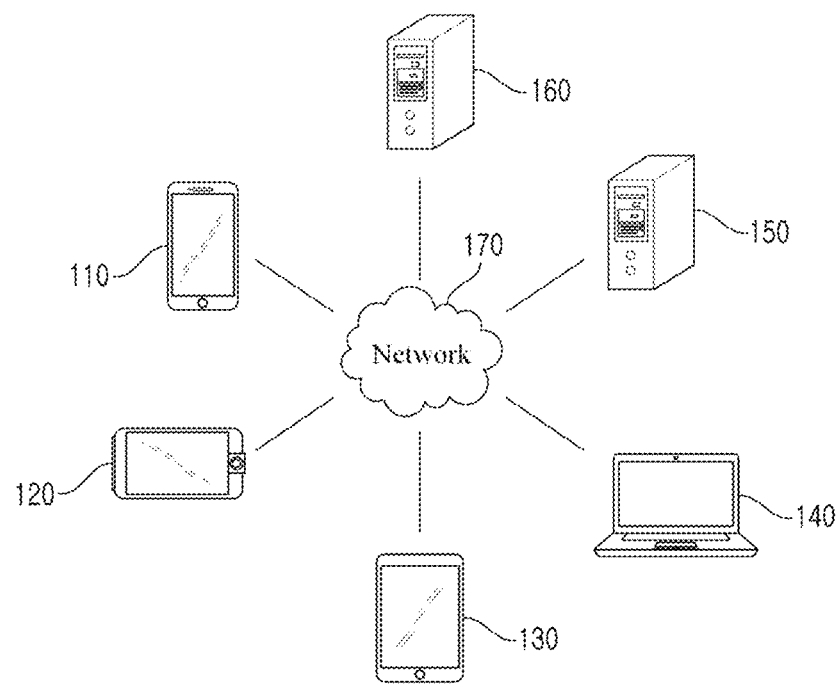
FIG. 1 is a diagram illustrating an example of a network environment according to an embodiment of the present invention.

FIG. 1 is a diagram illustrating an example of a network environment according to an embodiment of the present invention. In FIG. 1, the network environment illustrates an example including a plurality of electronic devices 110, 120, 130 and 140, a plurality of servers 150 and 160, and a network 170. FIG. 1 is an example of a description of the disclosure, and the number of electronic devices or the number of servers is not limited like FIG. 1. Furthermore, the network environment of FIG. 1 illustrates only one of environments which may be applied to the present embodiments, and an environment applicable to the present embodiments is not limited to the network environment of FIG. 1.

The plurality of electronic devices 110, 120, 130 and 140 may be stationary devices or mobile devices implemented as computer apparatuses. For example, the plurality of electronic devices 110, 120, 130 and 140 may include a smartphone, a mobile phone, a navigator, a computer, a laptop, a terminal for digital broadcasting, a personal digital assistants (PDA), a portable multimedia player (PMP), and a tablet PC. For example, in FIG. 1, an example of a shape of the electronic device 1 (110) is illustrated as being a smartphone. However, in embodiments of the present invention, the electronic device 1 (110) may mean one of various physical computer apparatuses capable of communicating with other electronic devices 120, 130 and 140 and/or the servers 150 and 160 over a network 170 substantially using a wireless or wired communication method.

A communication method is not limited, and may include short-distance wireless communication between devices in addition to communication methods using communication networks (e.g., a mobile communication network, wired Internet, wireless Internet and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer apparatus or a plurality of computer apparatuses, which provides a command, code, a file, content, or a service through communication with the plurality of electronic devices 110, 120, 130 and 140 over the network 170. For example, the server 150 may be a system that provides a service (e.g., a game service, a messaging service, a mail service, a social network service, a map service, a translation service, a financial service, a settlement service, a search service, or a content provision service) to the plurality of electronic devices 110, 120, 130 and 140 connected thereto over the network 170.

Figure 2:
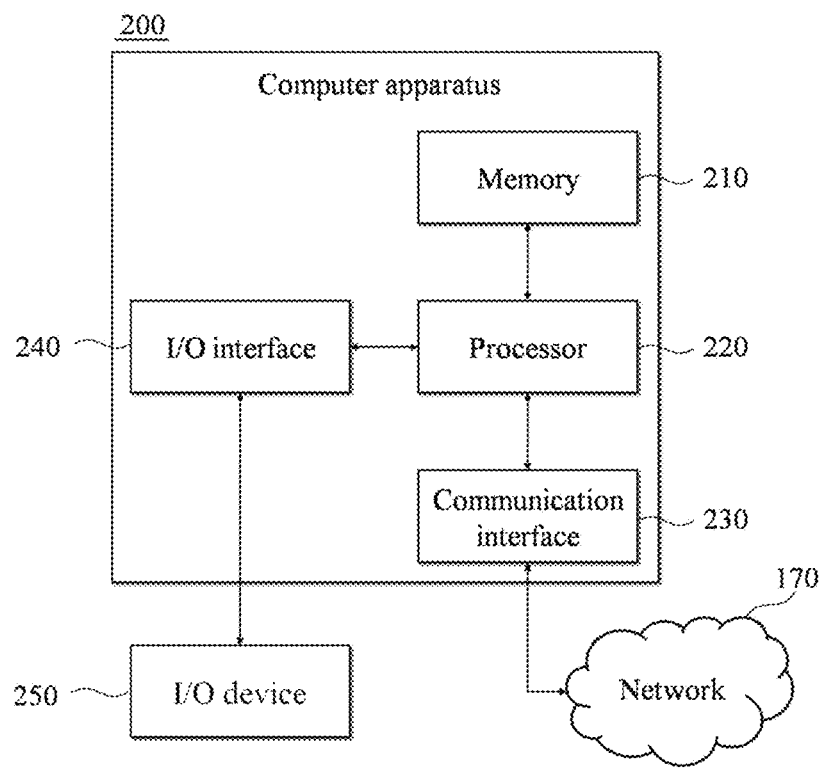
FIG. 2 is a block diagram illustrating an example of a computer apparatus according to an embodiment of the present invention.

FIG. 2 is a block diagram illustrating an example of a computer apparatus according to an embodiment of the present invention. Each of the plurality of electronic devices 110, 120, 130 and 140 or each of the servers 150 and 160 may be implemented by a computer apparatus 200 illustrated in FIG. 2.

As illustrated in FIG. 2, the computer apparatus 200 may include a memory 210, a processor 220, a communication interface 230 and an input/output (I/O) interface 240. The memory 210 is a computer-readable recording medium, and may include permanent mass storage devices, such as a random access memory (RAM), a read only memory (ROM) and a disk drive. In this case, the permanent mass storage device, such as a ROM and a disk drive, may be included in the computer apparatus 200 as a permanent storage device separated from the memory 210. Furthermore, an operating stem and at least one program code may be stored in the memory 210. Such software elements may be loaded from a computer-readable recording medium, separated from the memory 210, to the memory 210. Such a separate computer-readable recording medium may include computer-readable recording media, such as a floppy drive, a disk, a tape, a DVD/CD-ROM drive, and a memory card. In another embodiment, software elements may be loaded onto the memory 210 through the communication interface 230 not a computer-readable recording medium. For example, the software elements may be loaded onto the memory 210 of the computer apparatus 200 based on a computer program installed by files received over the network 170.

The processor 220 may be configured to process instructions of a computer program by performing default arithmetic, logic and I/O operations. The instructions may be provided to the processor 220 by the memory 210 or the communication interface 230. For example, the processor 220 may be configured to execute instructions received according to program code stored in a recording device, such as the memory 210.

The communication interface 230 may provide a function for enabling the computer apparatus 200 to communicate with other devices (e.g., the aforementioned storage devices) over the network 170. For example, a request, a command, data or a file generated by the processor 220 of the computer apparatus 200 based on program code stored in a recording device, such as the memory 210, may be provided to other devices over the network 170 under the control of the communication interface 230. Inversely, a signal, a command, data or a file from another device may be received by the computer apparatus 200 through the communication interface 230 of the computer apparatus 200 over the network 170. A signal, a command or a file received through the communication interface 230 may be transmitted to the processor 220 or the memory 210. A file received through the communication interface 230 may be stored in a storage device (the aforementioned permanent storage device) which may be further included in the computer apparatus 200.

The I/O interface 240 may be means for an interface with an input/output (I/O) device 250. For example, the input device may include a device, such as a microphone, a keyboard, a camera or a mouse. The output device may include a device, such as a display or a speaker. For another example, the I/O interface 240 may be means for an interface with a device in which functions for input and output have been integrated into one, such as a touch screen. The I/O device 250 may be configured as a single device along with the computer apparatus 200.

Furthermore, in other embodiments, the computer apparatus 200 may include elements greater or smaller than the elements of FIG. 2. However, it is not necessary to clearly illustrate most of conventional elements. For example, the computer apparatus 200 may be implemented to include at least some of the I/O device 250 or may further include other elements, such as a transceiver and a database.

Figure 3:
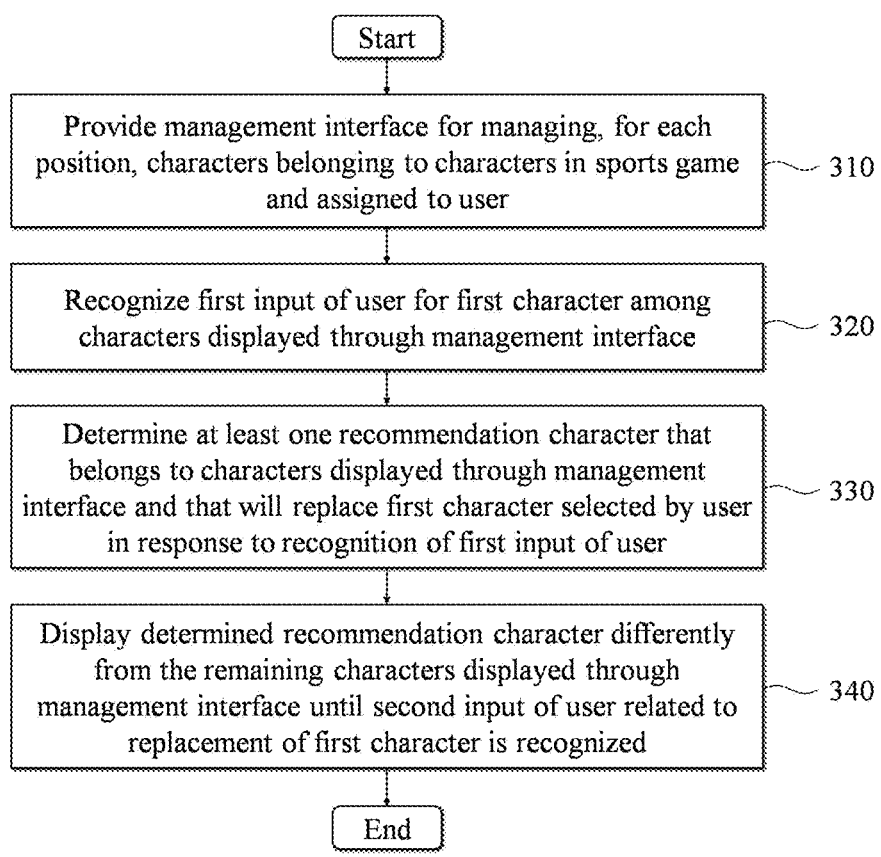
FIG. 3 is a flowchart illustrating an example of a player replacement method according to an embodiment of the present invention.

FIG. 3 is a flowchart illustrating an example of a player replacement method according to an embodiment of the present invention. The player replacement method according to the present embodiment may be performed by the computer apparatus 200. For example, the processor 220 of the computer apparatus 200 may be implemented to execute a control instruction according to a code of an operating system or a code of at least one computer program included in the memory 210. In this case, the processor 220 may control the computer apparatus 200 to perform steps 310 to 340 included in the method of FIG. 3 in response to the control instruction provided by a code stored in the computer apparatus 200. In this case, the computer program may include a game app for a sports game. Each of steps 310 to 340 may be performed by the processor 220 based on a code of the computer program. In some embodiments, at least one of steps 310 to 340 may be performed through communication with a server (e.g., the server 150 described with reference to FIG. 1) for providing game services over the network 170 under the control of a computer program.

At step 310, the computer apparatus 200 may provide a management interface for managing, for each position, characters belonging to characters in a sports game and assigned to a user. For example, the position may include a starting position and a candidate position. In this case, characters classified for each position through the management interface may be displayed in a screen. The user may change the positions of the characters through the management interface.

At step 320, the computer apparatus 200 may recognize a first input of the user for a first character among the characters displayed through the management interface. The first input may basically include an input to select the first character. Such a first input is described more specifically later.

At step 330, the computer apparatus 200 may determine at least one recommendation character that belongs to the characters displayed through the management interface and that will replace the first character selected by the user in response to the recognition of the first input of the user. A method of determining a recommendation character is described more specifically later.

At step 340, the computer apparatus 200 may differently display the determined recommendation character and the remaining characters displayed through the management interface until a second input of the user related to the replacement of the first character is recognized. In other words, when the user selects the first character, recommendation characters that will replace the first character are displayed differently from other characters, so the user can easily recognize a character to be replaced among multiple characters.

In one embodiment, the second input may include a cancellation input to cancel the first input or a selection input to select a second character that will replace the first character. In this case, the computer apparatus 200 may differently display a determined recommendation character and the remaining characters displayed through the management interface until the cancellation input or the selection input is recognized at step 340. For example, when the user selects the first character, the computer apparatus 200 may differently display, in a screen, the recommendation character determined at step 330 and other characters until the selection is cancelled or a second character for a replacement is selected at step 340. In this case, displaying the characters may include displaying at least one of the size or color of an object corresponding to each of the characters, the thickness of a line forming the object, or the size or thickness of text included in the object differently from those of objects corresponding to other characters.

In another embodiment, the first input and the second input may be performed through drag & drop. For example, the first input may include an input to drag an object corresponding to the first character in the state in which the selection of the first character is maintained. In this case, the selection of the first character may mean clicking an object corresponding to the first character using a mouse (e.g., in a PC environment) or touching the object with a finger (e.g., in a touch screen environment). The maintenance of the selection may mean the state in which the click or touch is maintained. At this time, the user may drag the object in the state in which the click or touch is maintained. In this case, the second input may include an input to release the selection of the first character. In this case, any one of the cancellation of the first input and the selection of the second character that will replace the first character may be determined based on a location where the selection is released. If the user releases the selection at the location where the second character has been displayed, the computer apparatus 200 may recognize the second character as a character to be replaced with the first character. In contrast, if the location where the selection is released is not the location where a replaceable character is displayed, the computer apparatus 200 may recognize that the first input has been cancelled (e.g., an attempt to replace the character has been cancelled). In this case, the computer apparatus 200 may display the determined recommendation character differently from the remaining characters displayed through the management interface until any one the cancellation of the first input or the selection of the second character is recognized.

Figure 4:
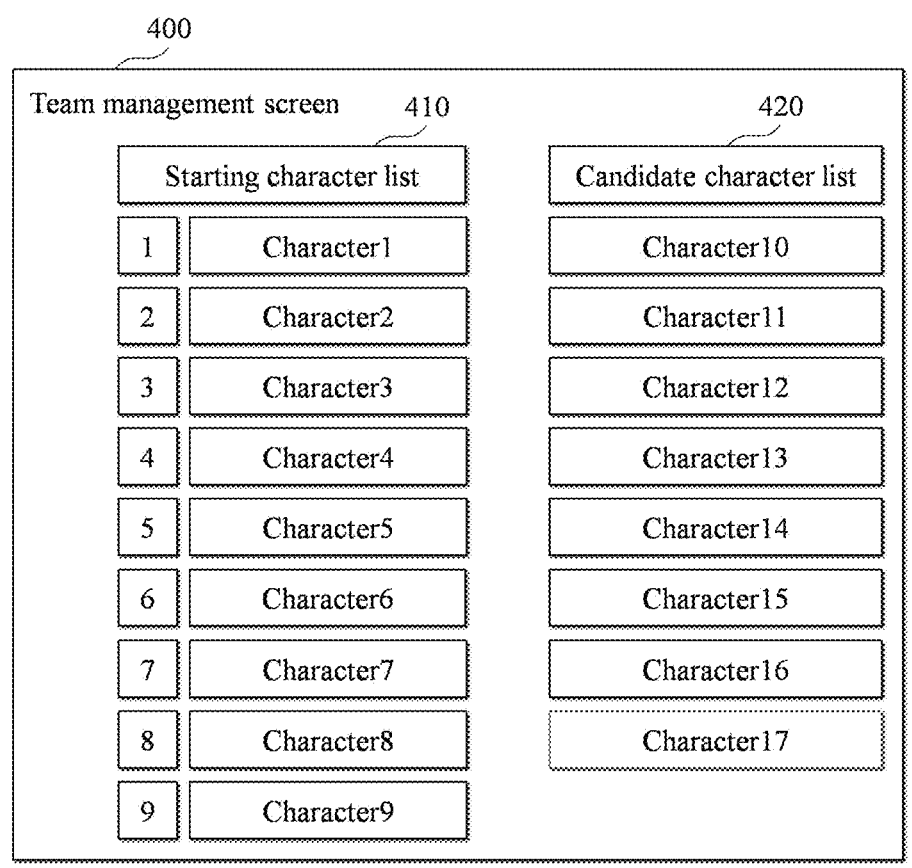
FIG. 4 is a diagram illustrating an example of a management interface in an embodiment of the present invention.

FIG. 4 is a diagram illustrating an example of a management interface in an embodiment of the present invention. The team management screen 400 may correspond to the management interface described with reference to FIG. 3. A team management screen 400 may further include more various functions, such as a function for actually displaying player information, a function for displaying a team strategy, a function for resetting the deployment of characters, and a function for storing the deployment of characters, but a description of unnecessary functions is omitted in describing a process of replacing a player. In this case, the embodiment of FIG. 4 illustrates an example of a baseball game. The team management screen 400 illustrates a starting character list 410 and a candidate character list 420. The starting character list 410 indicates characters (e.g., character 1 to character 9) corresponding to 9 starting players which will be on from the start in a baseball game instance. The candidate character list 420 indicates characters (e.g., character 10 to character 17) corresponding to 8 candidate players who will be on as candidates in the baseball game instance. A user may replace characters included in the same list and may replace characters included in different lists. In other words, the sequence between a starting character and a starting character or the sequence between a candidate character and a candidate character may be changed because not only a starting character and a candidate character are switched, but also characters included in the same list are switched. In this case, when a user selects one character, the computer apparatus 200 may determine a recommendation character that will replace the selected character and display the recommendation character differently from other characters so that the user can easily change the characters.

Figure 5:
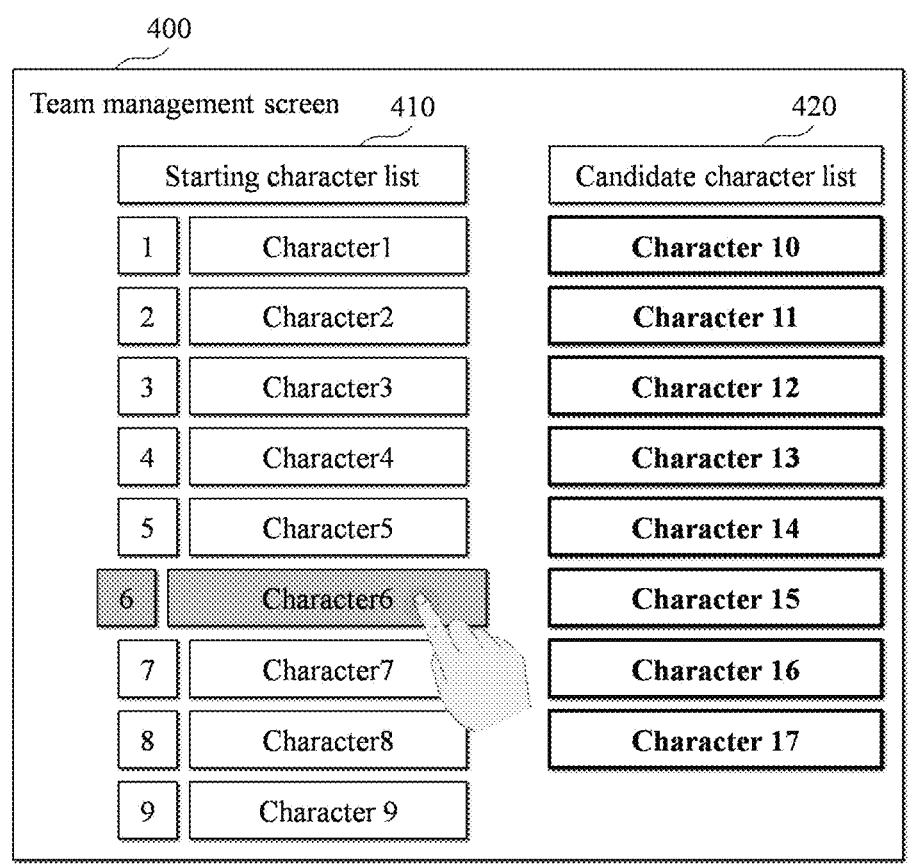
FIG. 5 is a diagram illustrating a first example in which recommendation characters are differently displayed in an embodiment of the present invention.

FIG. 5 is a diagram illustrating a first example in which recommendation characters are differently displayed in an embodiment of the present invention. The embodiment of FIG. 5 illustrates an example in which when a character 6 is selected by a user (when the user touches the region in which the character 6 has been displayed with a finger in a touch screen environment), at least one recommendation character (in the embodiment of FIG. 5, 8 candidate characters (e.g., character 10 to character 17) replaceable with the character 6) may be displayed differently from other characters (e.g., the thickness of the outer line of a character object and the thickness of the letter of the character object are adjusted an displayed). At this time, the at least one recommendation character may be displayed differently from other characters until the selection of the character 6 is cancelled (e.g., the user touches the region in which the character 6 has been displayed with a finger once more) or another character to be replaced is selected (e.g., the user touches the region in which a character (e.g., character 12) has been displayed with a finger once more). For example, if the user continuously selects the character 12 in the state in which the character 6 has been selected, the character 6 and the character 12 may be switched. In this case, the character 12 may be positioned at the No. 6 place of the starting character list 410. The character 6 may be positioned at the place of the character 12 of the candidate character list 420. This may mean that a starting player and a candidate player are switched.

Figure 6:
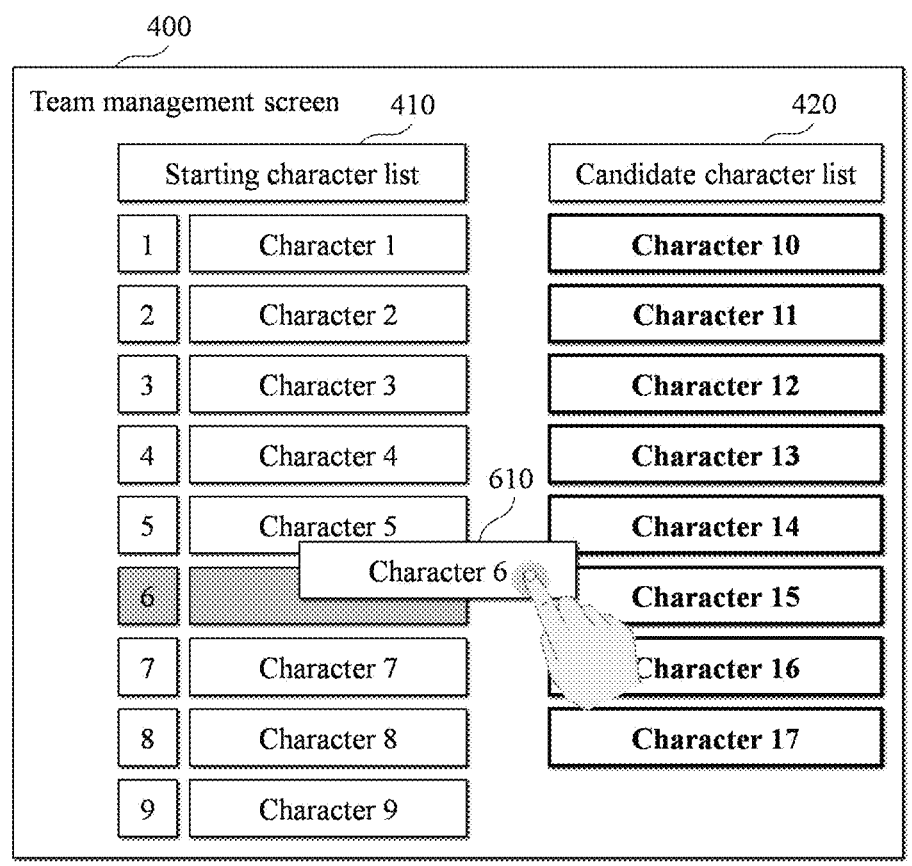
FIG. 6 is a diagram illustrating a second example in which recommendation characters are differently displayed in an embodiment of the present invention.

FIG. 6 is a diagram illustrating a second example in which recommendation characters are differently displayed in an embodiment of the present invention. The embodiment of FIG. 5 illustrates an example in which a character selection (or touch) by a user is recognized as the selection of a character. In contrast, the embodiment of FIG. 6 illustrates an example in which when the character 6 of the starting character list 410 is selected and dragged by a user (in a touch screen environment, the user touches and drags the region in which the character 6 has been displayed with a finger), at least one recommendation character (in the embodiment of FIG. 5, 8 candidate characters (e.g., the character 10 to the character 17) replaceable with the character 6) are displayed differently from other characters. At this time, the selection of the character 6 by the user may be cancelled or another character that will replace the character 6 may be selected depending on the location where the user releases the selection (i.e., the user drops an object 610 corresponding to the character 6). For example, when the user drops the object 610 to the location of the character 12 of the candidate character list 420, the character 6 and the character 12 may be switched. If the user drops the object 610 to a location where a character has not been displayed, the selection of the character 6 may be cancelled.

The embodiments of FIGS. 5 and 6 illustrate an example in which when a starting character is selected, candidate characters are determined and displayed as recommendation characters. In some embodiments, however, when a candidate character is selected, starting characters may be determined and displayed as recommendation characters.

Figure 7:
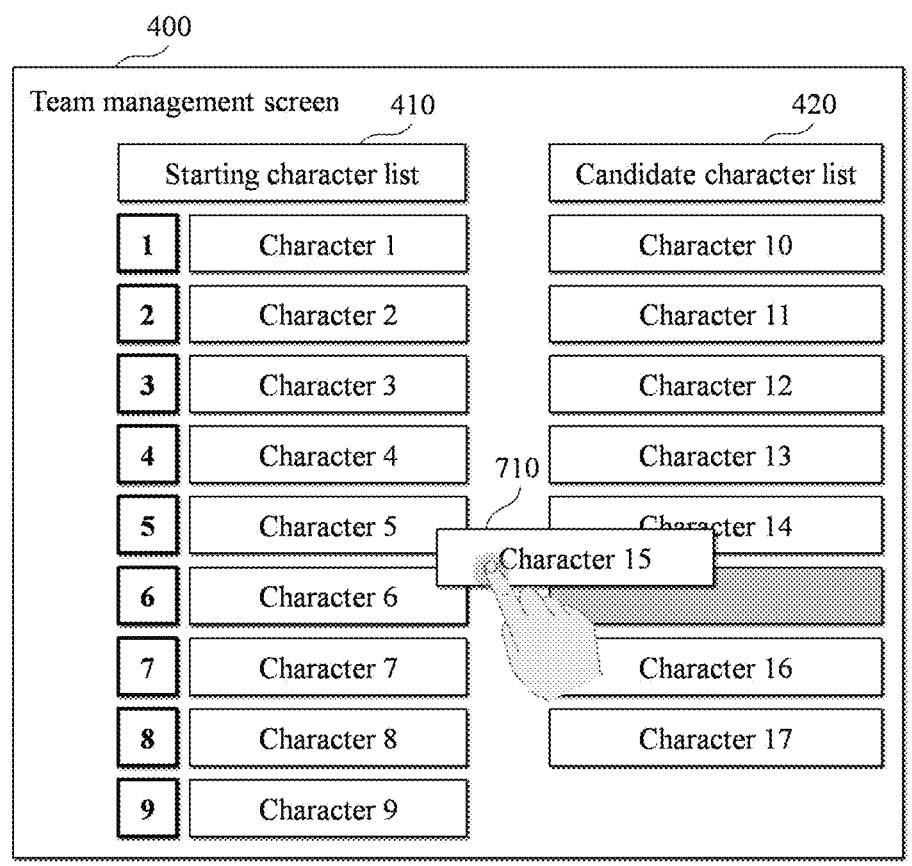
FIG. 7 is a diagram illustrating a third example in which a recommendation character is differently displayed in an embodiment of the present invention.

FIG. 7 is a diagram illustrating a third example in which a recommendation character is differently displayed in an embodiment of the present invention. The embodiment of FIG. 7 illustrates an example in which when the character 15 of the candidate character list 420 is touched and dragged, starting characters (e.g., the character 1 to the character 9) of the starting character list 410 are differently displayed (e.g., the thickness of the outer line and the thickness of the letter of a turn object in the starting character list 410 are adjusted and displayed). Even in this case, a character to be replaced may be selected or the selection of the character 15 may be cancelled depending on the location where a user drops the object 710 of the character 15.

The embodiments of FIGS. 5, 6 and 7 illustrate an example in which all candidate characters or all starting characters are determined and displayed as recommendation characters. In some embodiments, however, recommendation characters may be determined using more various methods.

Figure 8:
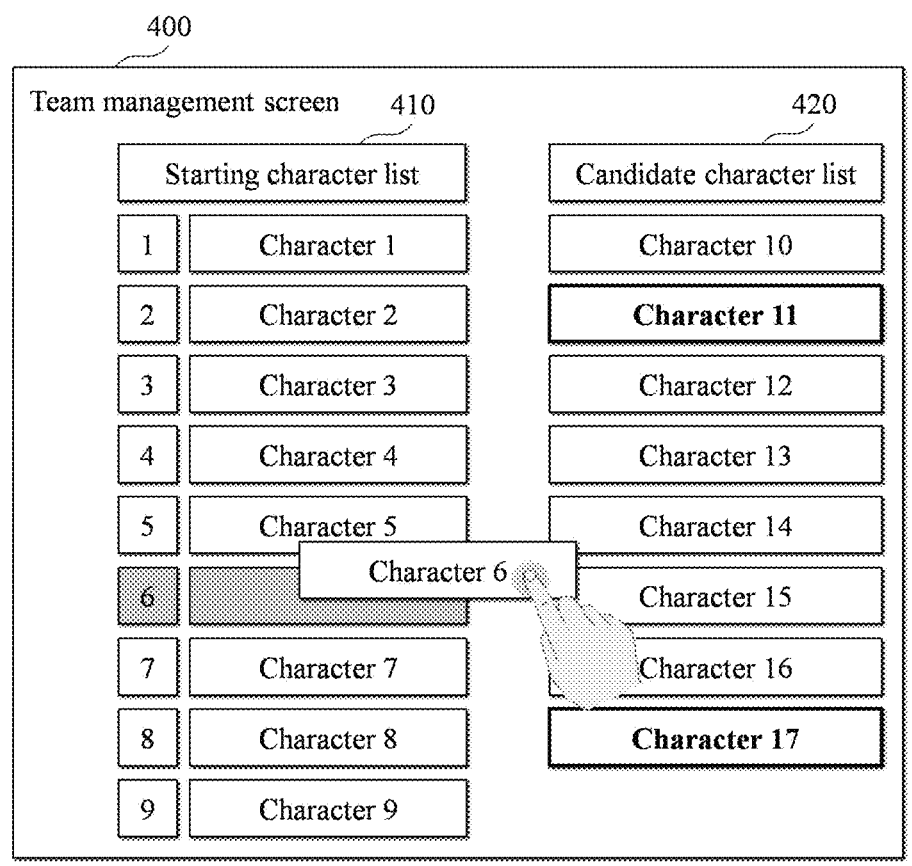
FIG. 8 is a diagram illustrating a fourth example in which recommendation characters are differently displayed in an embodiment of the present invention.

FIG. 8 is a diagram illustrating a fourth example in which recommendation characters are differently displayed in an embodiment of the present invention. The embodiment of FIG. 8 illustrates an example in which when the character 6 of the starting character list 410 is touched and dragged, some (e.g., the character 11 and the character 17) of the candidate characters of the candidate character list 420 are determined as recommendation characters and are differently displayed. For example, at step 330 of FIG. 3, if the position of the first character is a starting position for a sports game, the computer apparatus 200 may determine a recommendation character among characters for a candidate position based on at least a total status change of the characters for the starting position based on the replacement of the first character with each of the characters for the candidate position for the sports game. For example, the total status may be implemented in the form of a team strategy. In this case, the computer apparatus 200 may determine, as recommendation characters, candidate characters each having an increasing team strategy when each of the candidate characters replaces the first character. The embodiment of FIG. 8 may illustrate that the team strategy is increased when the character 6 is replaced with the character 11 or the character 17.

Figure 9:
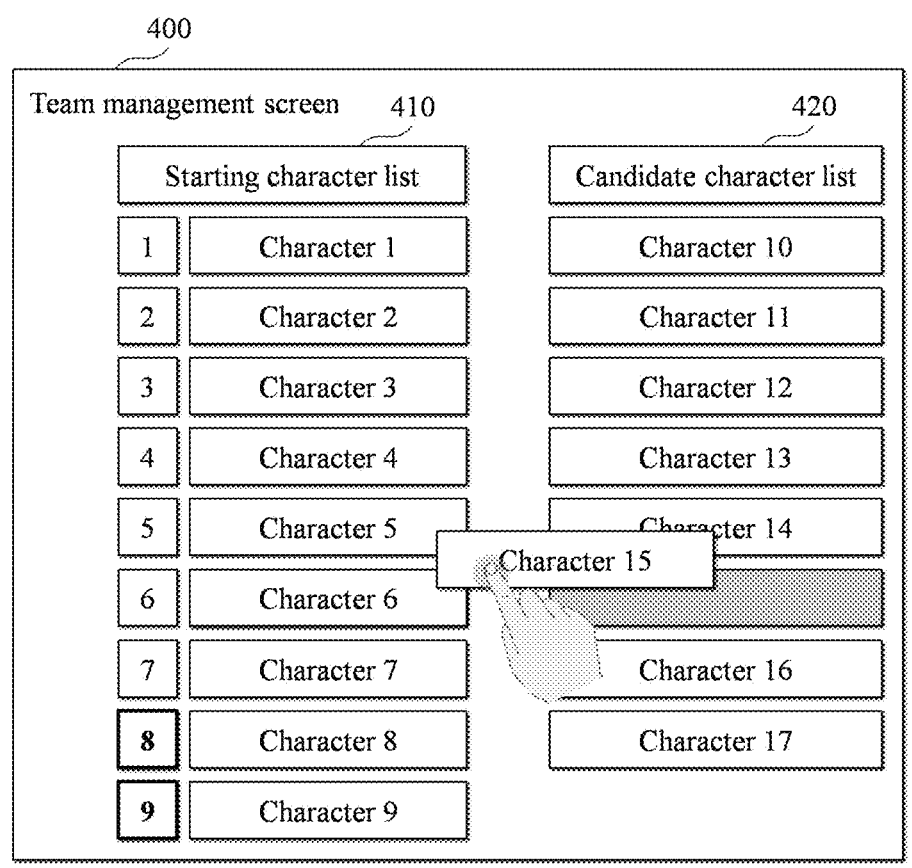
FIG. 9 is a diagram illustrating a fifth example in which recommendation characters are differently displayed in an embodiment of the present invention.

FIG. 9 is a diagram illustrating a fifth example in which recommendation characters are differently displayed in an embodiment of the present invention. The embodiment of FIG. 9 illustrates an example in which when the character 15 of the candidate character list 420 is touched and dragged, some (e.g., the character 8 and the character 9) of the starting characters of the starting character list 410 are determined as recommendation characters and differently displayed. For example, at step 330 of FIG. 3, if the position of the first character is a candidate position for a sports game, the computer apparatus 200 may determine a recommendation character among characters for the starting position based on at least a total status change of the characters for the starting position based on the replacement of the first character with each of the characters for the starting position for the sports game. Even in this case, the computer apparatus 200 may determine, as recommendation characters, starting characters each having an increasing team strategy when each of the recommendation characters replaces the first character. The embodiment of FIG. 9 may illustrate that the team strategy is increased when the character 15, that is, a candidate character, replaces the character 8 or the character 9, that is, a starting character.

In the embodiments of FIGS. 8 and 9, an example in which a recommendation character is determined based on a total team strategy change (or total status change) has been described. In some embodiments, if a team strategy is divided into various items (or status items), recommendation characters capable of reinforcing the status of a specific item of the items may be determined and suggested.

Furthermore, recommendation characters may be determined by further taking into consideration an opposing team strategy in a sports game instance to be performed in addition to the team strategy of a user himself or herself. For example, in a baseball game, when the team batting skill of a user team is lower than that of an opposing team, recommendation characters capable of increasing the team batting skill or recommendation characters capable of increasing team control may be determined and suggested. In this case, the user may be provided with a description regarding that each of recommendation characters can increase the capability of which item before the user selects the recommendation characters.

The computer apparatus 200 may determine a recommendation character based on the region in which the drag of a user is performed at step 330 of FIG. 3.

Figure 10:
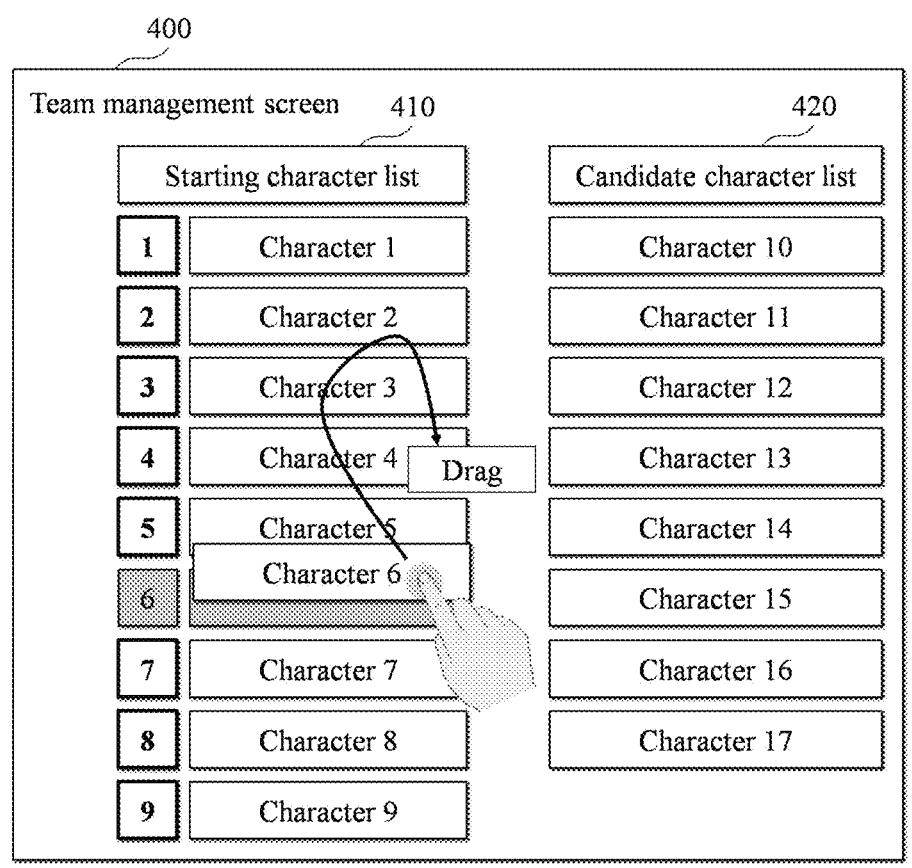
FIG. 10 is a diagram illustrating a sixth example in which a recommendation character is differently displayed in an embodiment of the present invention.

FIG. 10 is a diagram illustrating a sixth example in which a recommendation character is differently displayed in an embodiment of the present invention. The embodiment of FIG. 10 illustrates an example in which when a user selects the character 6 of the starting character list 410 and drags the character 6 within the region in which the starting character list 410 has been displayed, starting characters (e.g., the characters 1 to 5 and the characters 7 to 9 except the selected character 6) of the starting character list 410 are differently displayed based on the drag. In other words, the computer apparatus 200 may recognize that when the drag of the user is performed within the starting character list 410 in which the character 6 has been selected, the user changes the sequence of the characters of the starting character list 410. At this time, the computer apparatus 200 may suggest the starting characters of the starting character list 410 as recommendation characters. At this time, if the region in which the drag is performed deviates from the starting character list 410 and is directed toward the candidate character list 420, the computer apparatus 200 may suggest, as a recommendation character, (at least one of) candidate characters included in the candidate character list 420 as in the embodiment of FIG. 6.

It may be easily understood that such an operation may be similarly applied although the user selects a specific character in the candidate character list 420. In other words, if a first character is selected in a first list (e.g., the starting character list 410) and dragged within the region of the first list, the computer apparatus 200 may select a recommendation character among the characters of the first list. Furthermore, if a first character is selected in a first list and dragged toward a second list (e.g., the candidate character list 420) out of the region of the first list, the computer apparatus 200 may select a recommendation character among the characters of the second list. Likewise, if a first character is selected in the second list and dragged within the region of the second list, the computer apparatus 200 may select a recommendation character among the characters of the second list. Furthermore, if a first character is selected in the second list and dragged toward the first list out of the region of the second list, the computer apparatus 200 may select a recommendation character in the first list.

Furthermore, in FIGS. 5 to 10, player replacement processes based on the touch of a user in a touch screen environment have been described, but a player replacement process based on a mouse click in a PC environment may be easily understood based on the above description.

The aforementioned system or apparatus may be implemented in the form of a hardware element or a combination of a hardware element and a software element. For example, the apparatus and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processor may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or store media managed in a server. Examples of the program instruction may include machine-language code, such as code written by a compiler, and high-level language code executable by a computer using an interpreter. The hardware apparatus may be configured to operate one or more software modules in order to perform an operation of an embodiment, and vice versa.

As described above, according to embodiments of the present invention, if a given character located at a given position in a sports game (e.g., starting position or candidate position in a baseball game) and selected by the user is to be replaced with one of multiple different characters, at least one different character capable of being replaced with the given character is recommended at timing at which the user selects the given character. Accordingly, the user can easily recognize another character to be replaced with a character that belongs to multiple characters and that has been selected by the user.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:

1. A non-transitory processor-readable medium having instructions stored thereon, which when executed by one or more processors, cause the one or more processors to implement a player replacement method, comprising:
providing a management interface for managing, for each position, characters assigned to a user among characters in a sports game;
recognizing a first input of the user for a first character among the characters displayed through the management interface;
determining at least one recommendation character to be replaced with the first character selected by the user among the characters displayed through the management interface in response to the recognition of the first input of the user; and
displaying the determined recommendation character differently from remaining characters displayed through the management interface until a second input of the user related to the replacement of the first character is recognized;
wherein determining the at least one recommendation character comprises determining the recommendation character among characters for a candidate position for the sports game based on at least a total status change of characters for a starting position when each of the characters for the candidate position is replaced with the first character if a position of the first character is the starting position for the sports game.

2. The non-transitory processor-readable medium of claim 1, wherein determining the at least one recommendation character comprises:
determining, as a recommendation character, at least one of characters for a candidate position in the sports game when a position of the first character is a starting position for the sports game, and determining, as a recommendation character, at least one of characters for the starting position when the position of the first character is the candidate position.

3. The non-transitory processor-readable medium of claim 1, wherein:
the first input is an input to drag an object corresponding to the first character in a state in which the selection of the first character has been maintained, and
determining the at least one recommendation character comprises determining the recommendation character based on at least a region in which the drag is performed.

4. The non-transitory processor-readable medium of claim 3, wherein:
the management interface comprises a first list of characters for a starting position for the sports game and a second list of characters for a candidate position for the sports game, and
determining the at least one recommendation character comprises:
selecting the recommendation character among the characters of the first list when the first character is selected in the first list and dragged within a region of the first list,
selecting the recommendation character among the characters of the second list when the first character is selected in the first list and dragged toward the second list out of the region of the first list,
selecting the recommendation character among the characters of the second list when the first character is selected within the second list and dragged within a region of the second list, and
selecting the recommendation character in the first list when the first character is selected in the second list and dragged toward the first list out of the region of the second list.

5. The non-transitory processor-readable medium of claim 1, wherein determining the at least one recommendation character comprises determining the recommendation character among characters for a starting position for the sports game based on at least a total status change of the characters for the starting position when each of the characters for the starting position is replaced with the first character if a position of the first character is a candidate position for the sports game.

6. The non-transitory processor-readable medium of claim 1, wherein:
the second input comprises a cancellation input for cancelling the first input or a selection input for selecting a second character to replace the first character, and
displaying the determined recommendation character comprises displaying the determined recommendation character differently from remaining characters displayed through the management interface until the cancellation input or the selection input is recognized.

7. The non-transitory processor-readable medium of claim 1, wherein:
the first input comprises an input to drag an object corresponding to the first character in a state in which the selection of the first character has been maintained,
the second input comprises an input to release the selection of the first character,
any one of a cancellation of the first input and a selection of a second character to replace the first character is determined based on a location where the selection is released, and displaying the determined recommendation character comprises displaying the determined recommendation character differently from remaining characters displayed through the management interface until any one of the cancellation of the first input or the selection of the second character is recognized.

8. A player replacement method performed by a computer apparatus comprising at least one processor, the method comprising:
providing, by the at least one processor, a management interface for managing, for each position, characters assigned to a user among characters in a sports game;
recognizing, by the at least one processor, a first input of the user for a first character among the characters displayed through the management interface;
determining, by the at least one processor, at least one recommendation character to be replaced with the first character selected by the user among the characters displayed through the management interface in response to the recognition of the first input of the user; and
displaying, by the at least one processor, the determined recommendation character differently from remaining characters displayed through the management interface until a second input of the user related to the replacement of the first character is recognized;
wherein determining the at least one recommendation character comprises determining the recommendation character among characters for a candidate position for the sports game based on at least a total status change of characters for a starting position when each of the characters for the candidate position is replaced with the first character if a position of the first character is the starting position for the sports game.

9. The player replacement method of claim 8, wherein:
the first input is an input to drag an object corresponding to the first character in a state in which the selection of the first character has been maintained, and
determining the at least one recommendation character comprises determining the recommendation character based on at least a region in which the drag is performed.

10. The player replacement method of claim 9, wherein:
the management interface comprises a first list of characters for a starting position for the sports game and a second list of characters for a candidate position for the sports game, and
determining the at least one recommendation character comprises:
selecting the recommendation character among the characters of the first list when the first character is selected in the first list and dragged within a region of the first list,
selecting the recommendation character among the characters of the second list when the first character is selected in the first list and dragged toward the second list out of the region of the first list,
selecting the recommendation character among the characters of the second list when the first character is selected within the second list and dragged within a region of the second list, and
selecting the recommendation character in the first list when the first character is selected in the second list and dragged toward the first list out of the region of the second list.

11. The player replacement method of claim 8, wherein determining the at least one recommendation character comprises:
　　determining, as a recommendation character, at least one of characters for a candidate position in the sports game when a position of the first character is a starting position for the sports game, and
　　determining, as a recommendation character, at least one of characters for the starting position when the position of the first character is the candidate position.

12. The player replacement method of claim 8, wherein determining the at least one recommendation character comprises determining the recommendation character among characters for a starting position for the sports game based on at least a total status change of the characters for the starting position when each of the characters for the starting position is replaced with the first character if a position of the first character is a candidate position for the sports game.

13. The player replacement method of claim 8, wherein:
　　the second input comprises a cancellation input for cancelling the first input or a selection input for selecting a second character to replace the first character, and
　　displaying the determined recommendation character comprises displaying the determined recommendation character differently from remaining characters displayed through the management interface until the cancellation input or the selection input is recognized.

14. The player replacement method of claim 8, wherein:
　　the first input comprises an input to drag an object corresponding to the first character in a state in which the selection of the first character has been maintained,
　　the second input comprises an input to release the selection of the first character,
　　any one of a cancellation of the first input and a selection of a second character to replace the first character is determined based on a location where the selection is released, and
　　displaying the determined recommendation character comprises displaying the determined recommendation character differently from remaining characters displayed through the management interface until any one of the cancellation of the first input or the selection of the second character is recognized.

15. A non-transitory processor-readable medium having instructions stored thereon, which when executed by one or more processors, cause the one or more processors to implement a player replacement method, comprising:
　　providing a management interface for managing, for each position, characters assigned to a user among characters in a sports game;
　　recognizing a first input of the user for a first character among the characters displayed through the management interface;
　　determining at least one recommendation character to be replaced with the first character selected by the user among the characters displayed through the management interface in response to the recognition of the first input of the user; and
　　displaying the determined recommendation character differently from remaining characters displayed through the management interface until a second input of the user related to the replacement of the first character is recognized;
　　wherein determining the at least one recommendation character comprises determining the recommendation character among characters for a starting position for the sports game based on at least a total status change of the characters for the starting position when each of the characters for the starting position is replaced with the first character if a position of the first character is a candidate position for the sports game.

16. The non-transitory processor-readable medium of claim 15, wherein determining the at least one recommendation character comprises:
　　determining, as a recommendation character, at least one of characters for a candidate position in the sports game when a position of the first character is a starting position for the sports game, and
　　determining, as a recommendation character, at least one of characters for the starting position when the position of the first character is the candidate position.

17. The non-transitory processor-readable medium of claim 15, wherein:
　　the first input is an input to drag an object corresponding to the first character in a state in which the selection of the first character has been maintained, and
　　determining the at least one recommendation character comprises determining the recommendation character based on at least a region in which the drag is performed.

18. The non-transitory processor-readable medium of claim 17, wherein:
　　the management interface comprises a first list of characters for a starting position for the sports game and a second list of characters for a candidate position for the sports game, and
　　determining the at least one recommendation character comprises:
　　　　selecting the recommendation character among the characters of the first list when the first character is selected in the first list and dragged within a region of the first list,
　　　　selecting the recommendation character among the characters of the second list when the first character is selected in the first list and dragged toward the second list out of the region of the first list,
　　　　selecting the recommendation character among the characters of the second list when the first character is selected within the second list and dragged within a region of the second list, and
　　　　selecting the recommendation character in the first list when the first character is selected in the second list and dragged toward the first list out of the region of the second list.

19. The non-transitory processor-readable medium of claim 15, wherein:
　　the second input comprises a cancellation input for cancelling the first input or a selection input for selecting a second character to replace the first character, and
　　displaying the determined recommendation character comprises displaying the determined recommendation character differently from remaining characters displayed through the management interface until the cancellation input or the selection input is recognized.

20. The non-transitory processor-readable medium of claim 15, wherein:
　　the first input comprises an input to drag an object corresponding to the first character in a state in which the selection of the first character has been maintained,
　　the second input comprises an input to release the selection of the first character, any one of a cancellation of the first input and a selection of a second character to replace the first character is determined based on a location where the selection is released, and displaying the determined recommendation character comprises displaying the determined recommendation character differently from remaining characters displayed through the management interface until any one of the cancellation of the first input or the selection of the second character is recognized.

* * * * *